(12) United States Patent
Okabayashi

(10) Patent No.: US 9,860,002 B2
(45) Date of Patent: Jan. 2, 2018

(54) AUDIO SIGNAL PROCESSING APPARATUS AND STORAGE MEDIUM

(71) Applicant: YAMAHA CORPORATION, Hamamatsu-shi, Shizuoka-ken (JP)

(72) Inventor: Masaaki Okabayashi, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 0 days.

(21) Appl. No.: 15/070,274

(22) Filed: Mar. 15, 2016

(65) Prior Publication Data

US 2016/0277857 A1    Sep. 22, 2016

(30) Foreign Application Priority Data

Mar. 19, 2015  (JP) ................................ 2015-055569

(51) Int. Cl.
```
H04R 29/00      (2006.01)
H04H 60/04      (2008.01)
G11B 27/00      (2006.01)
H04R 3/04       (2006.01)
H04S 7/00       (2006.01)
```

(52) U.S. Cl.
CPC ............. *H04H 60/04* (2013.01); *G11B 27/00* (2013.01); *H04R 3/04* (2013.01); *H04R 2420/01* (2013.01); *H04S 7/307* (2013.01)

(58) Field of Classification Search
CPC ......... H04R 5/00; H04R 2420/01; H04R 3/04
USPC .......................................... 381/119, 27, 56
See application file for complete search history.

(56) References Cited

U.S. PATENT DOCUMENTS

| | | | |
|---|---|---|---|
| 6,931,134 B1* | 8/2005 | Waller, Jr. ........... | G10H 1/0091 381/119 |
| 2008/0219478 A1* | 9/2008 | Aoki ..................... | H04H 60/04 381/119 |
| 2008/0226099 A1* | 9/2008 | Aiso ..................... | H04H 60/04 381/119 |
| 2009/0248183 A1* | 10/2009 | Miwa .................... | H04H 60/04 700/94 |

(Continued)

OTHER PUBLICATIONS

"Digital Mixing Console CL5 CL3 CL1 Owner's Manual", Yamaha Corporation, 2012, especially pp. 11, 13, 15, 53, 64. English version of manual provided (pp. 11, 13, 15, 61 and 62 of the English version correspond to pp. 11, 13, 15, 63, 64 of the Japanese version).

*Primary Examiner* — Akelaw Teshale
(74) *Attorney, Agent, or Firm* — Rossi, Kimms & McDowell LLP

(57) ABSTRACT

An audio signal in a plurality of input channels each including an equalizer and a dynamics as a first signal processing part is taken out as a cue signal by a cue switch 126, and the cue signal is outputted to a monitoring output terminal via a cue output channel 160. In the cue output channel, there are provided an equalizer 163 and a dynamics 164, as a second signal processing part, which perform signal processing common to the first signal processing part of the input channel in accordance with values of second parameters which are editable independently from first parameters used by the first signal processing part. In this configuration, it is preferable that the values of the second parameters may be reflected onto signal processing in the input channel in accordance with an instruction by a user.

9 Claims, 6 Drawing Sheets

(56) References Cited

U.S. PATENT DOCUMENTS

| | | | | |
|---|---|---|---|---|
| 2010/0239107 A1* | 9/2010 | Fujita | ............... | H04H 60/04 381/119 |
| 2011/0075864 A1* | 3/2011 | Hagiwara | ............... | H04H 60/04 381/119 |
| 2011/0083178 A1* | 4/2011 | Fukata | ............... | G06F 21/123 726/21 |
| 2011/0083198 A1* | 4/2011 | Hagiwara | ............... | G06F 21/10 726/29 |
| 2012/0020497 A1* | 1/2012 | Okabayashi | ............... | H04H 60/04 381/119 |
| 2013/0310954 A1* | 11/2013 | Okabayashi | ............... | G05B 19/106 700/20 |

* cited by examiner

{Fig.1}
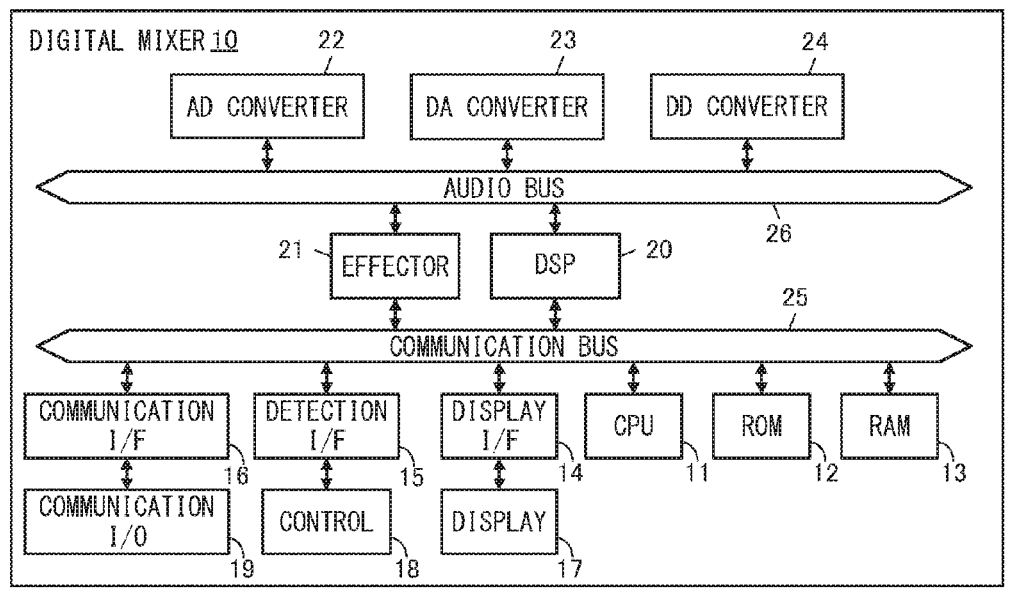
{Fig.2}
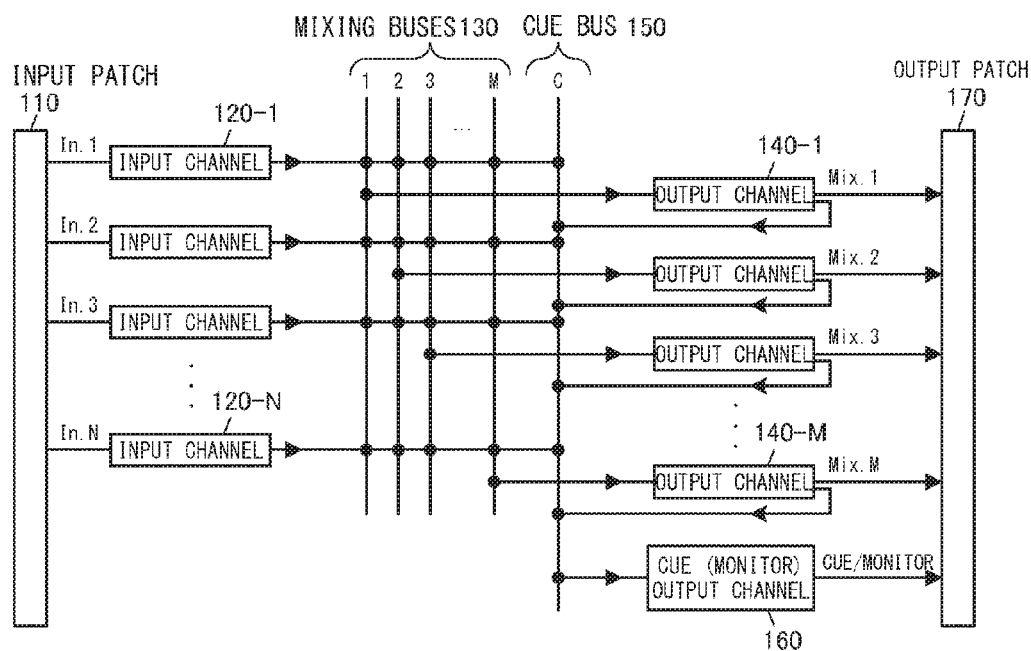

{Fig.3}
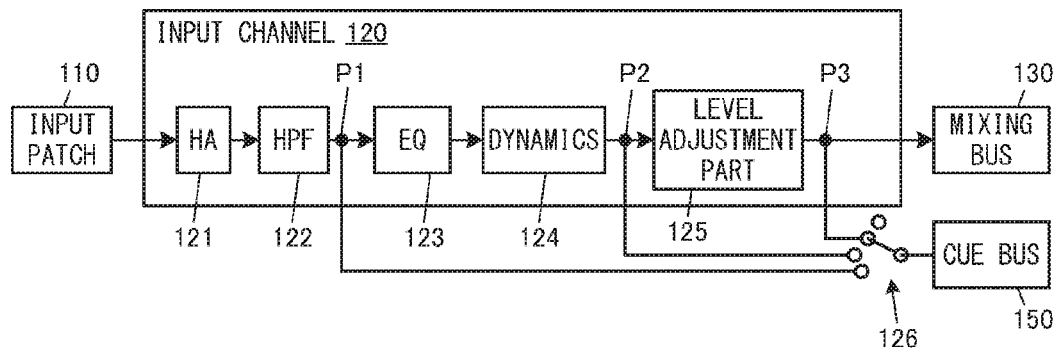
{Fig.4}
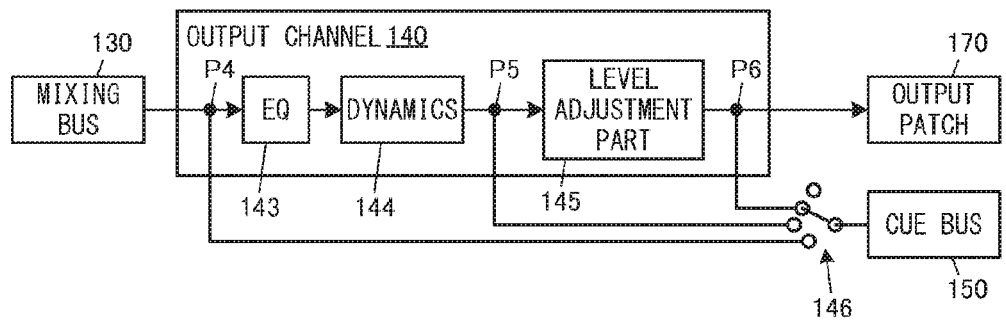
{Fig.5}
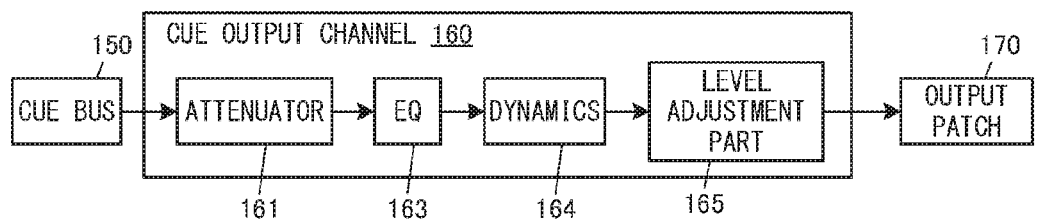

{Fig.6}
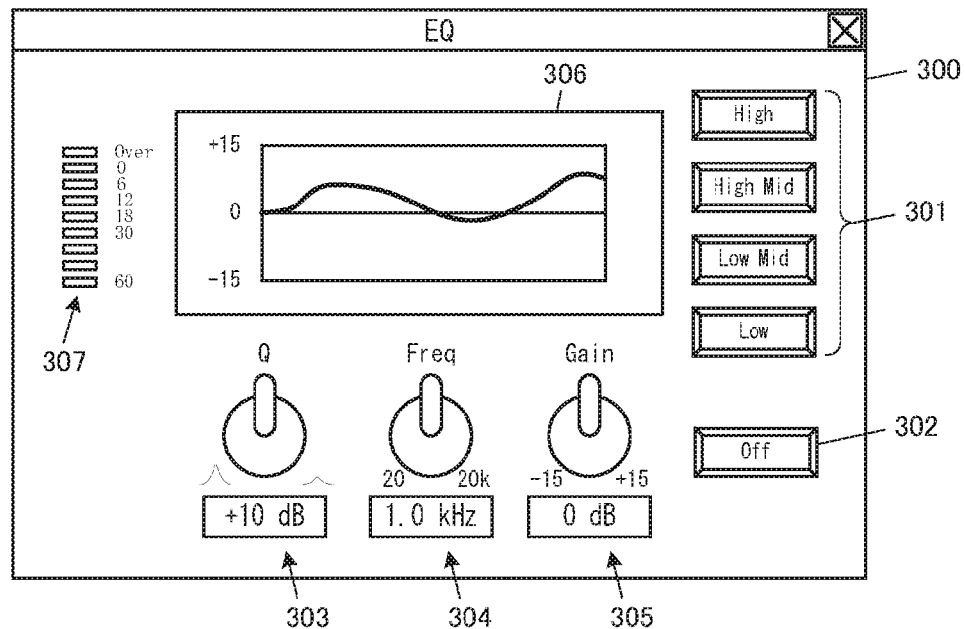
{Fig.7}
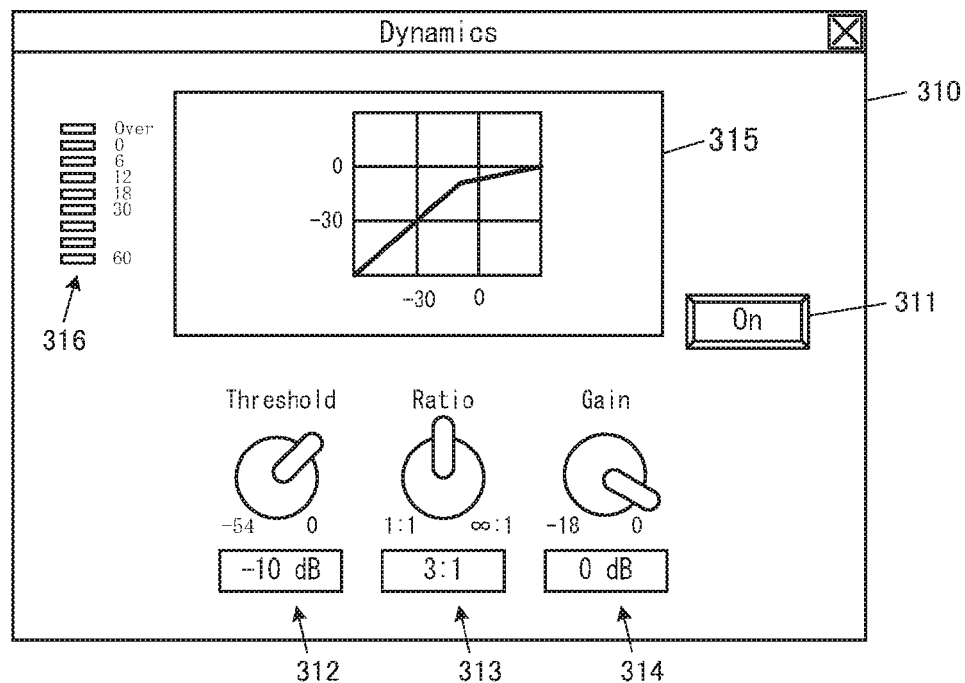

{Fig.8}
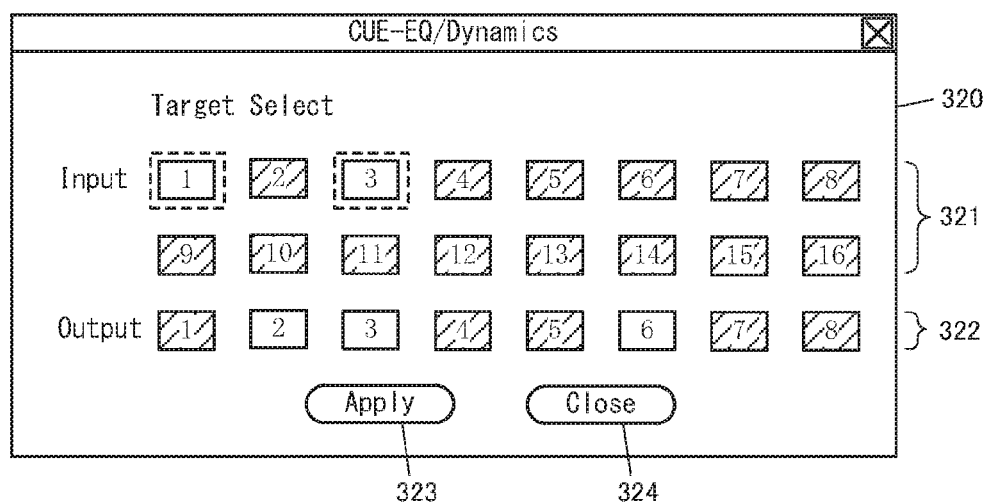

{Fig.9}
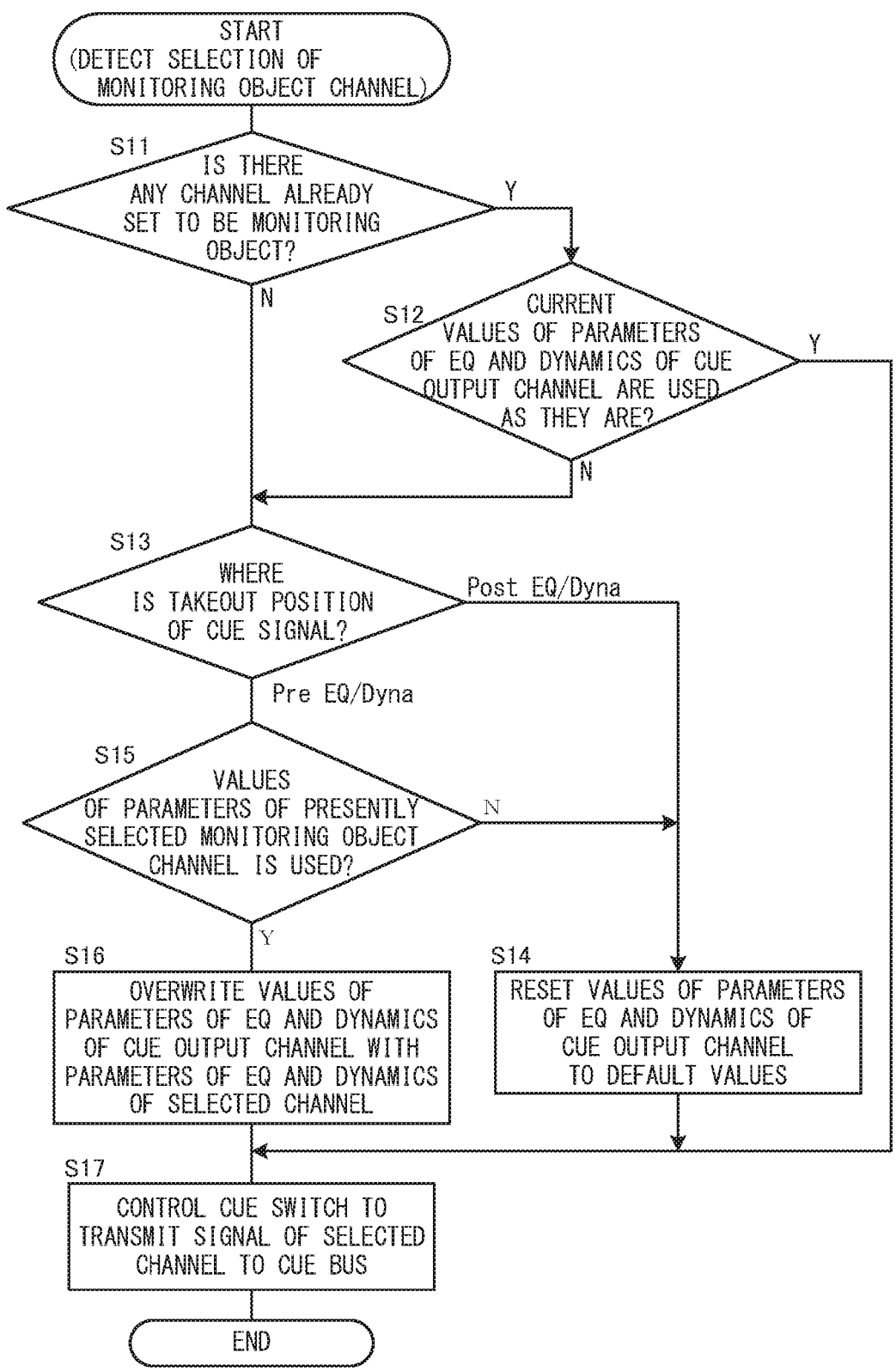

{Fig.10}
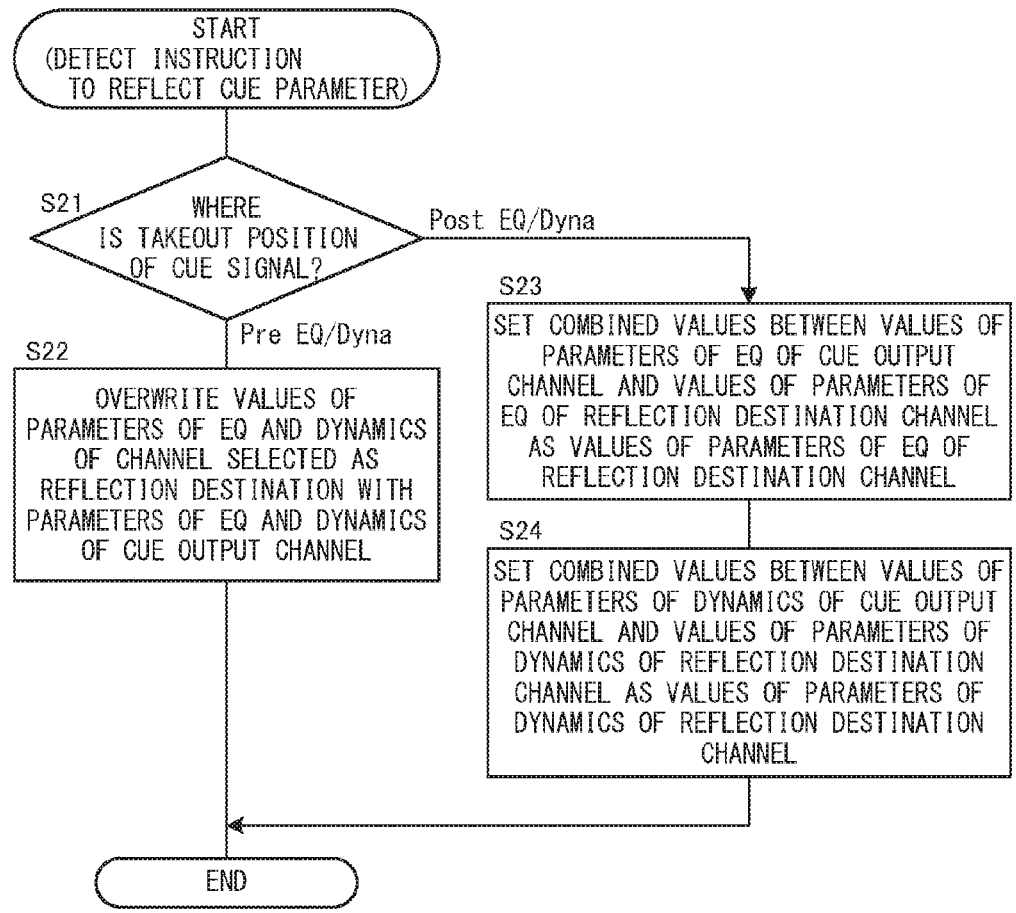
{Fig.11}
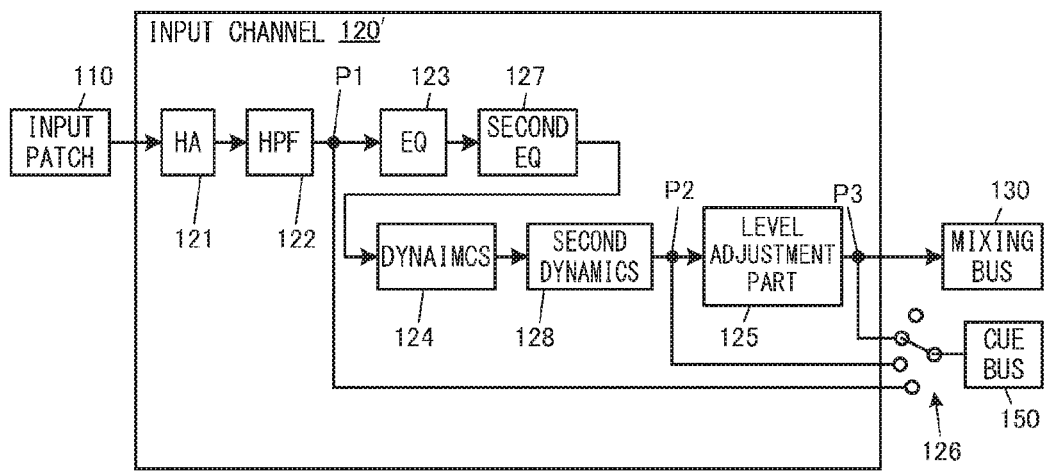

US 9,860,002 B2

AUDIO SIGNAL PROCESSING APPARATUS AND STORAGE MEDIUM

TECHNICAL FIELD

The invention relates to an audio signal processing apparatus performing audio signal processing in a plurality of signal processing channels and including a function to monitor the audio signal being processed in the signal processing channel, and a storage medium containing program instructions enabling a computer to function as such an audio signal processing apparatus.

BACKGROUND ART

An audio signal processing apparatus performing audio signal processing in a plurality of signal processing channels in which an audio signal in an arbitrarily selected signal processing channel can be monitored has been conventionally known (refer to NPL1). Functions relating to the monitoring is called as a CUE function or a monitoring function.

In a digital mixer described in NPL1, a user can instruct the digital mixer, by operating a CUE key provided in a channel strip, to output an audio signal in a signal processing channel which corresponds to the channel strip to a CUE bus, and to output the audio signal as a cue signal for monitoring via the CUE bus.

CITATION LIST

Non Patent Literature

{NPL1} "DIGITAL MIXING CONSOLE CL5 CL3 CL1 Owner's Manual", YAMAHA Corporation, 2012, especially pp. 11, 13, 15, 63, 64

SUMMARY OF INVENTION

Technical Problem

Incidentally, in a conventional digital mixer, signal processing parts for adjusting characteristics of signals such as an equalizer and a dynamics were not provided in an output path of the cue signal. Therefore, the user basically had to monitor the audio signal taken out of the signal processing channel for monitoring as it was though it was possible to perform a level adjustment or the like. It was a matter of course to listen the audio signal of a desired signal processing channel as it was from a viewpoint of the "monitoring".

On the other hand, there has been a requirement to adjust the signal characteristics as for the audio signal for monitoring. For example, when the characteristics of the audio signals which are transmitted to speakers of a hall are adjusted during performance before the audience, if a signal processing parameter of a signal processing channel which processes the audio signal is changed, the change is reflected onto an audio output to the hall. Accordingly, the requirement is such that values of the signal processing parameters are adjusted while monitoring the corresponding audio signal, and the values are reflected onto the signal processing in the signal processing channel at a time when a desired values could be set.

The invention is made in consideration of the circumstances as stated above, and an object thereof is to enable to adjust characteristics of an audio signal for monitoring without affecting on the audio signal for the performance.

Solution to Problem

In order to achieve the above-described object, an audio signal processing apparatus according to the invention is an audio signal processing apparatus including: a plurality of signal processing channels each having a first signal processing part, and processing an input audio signal in the first signal processing part; a second signal processing part for performing signal processing common to the first signal processing part of the signal processing channel in accordance with values of second parameters which are editable independently from first parameters used by the first signal processing part; a signal supplier for taking out an audio signal at a specified position in the signal processing channel as a cue signal and supplying the cue signal to the second signal processing part; and a controller for reflecting the values of the second parameters onto the processing in the signal processing channel in accordance with an instruction by a user.

In the above audio signal processing apparatus, it is conceivable that the controller is configured to reflect the values of the second parameters onto the processing in a specific signal processing channel selected by the user among the plurality of signal processing channels.

Further, it is also conceivable that the signal supplier includes a first selector for selecting the specified position to take out the audio signal from the signal processing channel, and the controller is configured to perform the reflection by overwriting the values of the first parameters with the values of the second parameters when the specified position selected by the selector is prior to the first signal processing part.

Alternatively, it is also conceivable that the signal supplier includes a first selector for selecting the specified position to take out the audio signal from the signal processing channel, and the controller is configured to perform the reflection by combining the values of the first parameters with the values of the second parameters when the position selected by the selector is posterior to the first signal processing part.

Further, it is also conceivable that the signal supplier includes a second selector for selecting a signal processing channel from which the audio signal is to be taken out, and the audio signal processing apparatus further includes a first parameter controller for changing the values of the second parameters into the values of the first parameters of a newly selected signal processing channel when the second selector newly selects the signal processing channel.

Furthermore, it is also conceivable that the audio signal processing apparatus further comprises a second parameter controller for changing the values of the first parameters at the signal processing channel selected by the second selector into the values of the second parameters in accordance with an instruction by the user.

Further, it is also conceivable that the signal supplier includes a mixer for generating the cue signal by taking out the audio signals from plural signal processing channels among the plurality of signal processing channels selected by the user and mixing the taken out audio signals, and the audio signal processing apparatus further comprises: a third selector which selects one signal processing channel from among the plural signal processing channels selected by the user; and a third parameter controller for changing the values of the second parameters into the values of the first parameters of the signal processing channel selected by the third selector in accordance with an instruction by the user.

The above configuration can be realized or embodied as an arbitrary style such as a system, a method, a computer program, a storage medium storing a computer program, other than the above device.

Advantageous Effects of Invention

According to the above configuration, it is possible to adjust characteristics of an audio signal for monitoring without affecting on the audio signal for the performance.

BRIEF DESCRIPTION OF DRAWINGS

FIG. 1 is a view illustrating a hardware configuration example of a digital mixer being an embodiment of an audio signal processing apparatus of the invention.

FIG. 2 is a view illustrating a configuration of signal processing function performed in a DSP illustrated in FIG. 1 in more detail.

FIG. 3 is a view illustrating a configuration of an input channel illustrated in FIG. 2 in more detail.

FIG. 4 is a view illustrating a configuration of an output channel illustrated in FIG. 2 in more detail.

FIG. 5 is a view illustrating a configuration of a cue channel illustrated in FIG. 2 in more detail.

FIG. 6 is a view illustrating a display example of an EQ setting screen.

FIG. 7 is a view illustrating a display example of a dynamics setting screen.

FIG. 8 is a view illustrating a display example of a cue setting screen.

FIG. 9 is a flowchart of processing executed by a CPU of the digital mixer when a monitoring object channel is newly selected.

FIG. 10 is a flowchart of processing executed by the same when an operation of an apply button is detected.

FIG. 11 is a view illustrating another configuration example of an input channel.

DESCRIPTION OF EMBODIMENTS

Hereinafter, embodiments of the invention are concretely described based on the drawings.

At first, a configuration of a digital mixer being an embodiment of an audio signal processing apparatus of the invention is illustrated in FIG. 1.

A digital mixer 10 illustrated in FIG. 1 includes a CPU 11, a ROM 12, a RAM 13, a display I/F 14, a detection I/F 15, a communication I/F 16, a DSP (digital signal processor) 20, and an effector 21, and they are connected via a communication bus 25. Besides, a display 17 is connected to the display I/F 14, a control 18 is connected to the detection I/F 15, and a communication input/output part (I/O) 19 is connected to the communication I/F 16, respectively. Further, an AD converter 22, a DA converter 23, a DD converter 24 are also included, and they are connected to the DSP 20 and the effector 21 via an audio bus 26.

Among them, the CPU 11 is a controller integrally controlling operations of the digital mixer 10, and performs processes to control displays on the display 17, detection of operations to the control 18, communication through the communication I/O 19, and so on via respective I/Fs 14 to 16, and to control signal processing in the DSP 20 by executing predetermined programs stored in the ROM 12.

The ROM 12 is a rewritable nonvolatile storage storing control programs executed by the CPU 11, or the like. A flash memory or the like can be used as the ROM 12.

The RAM 13 is a memory for storing parameter values to be reflected on the signal processing in the DSP 20, and used as a work memory of the CPU 11.

The display I/F 14 is an interface to control display contents in accordance with instructions from the CPU 11 by connecting the display 17 to the communication bus 25. The display 17 is a display device made up of a liquid crystal display (LCD) or the like. The display 17 displays a screen showing a current state of the digital mixer 10, a screen to refer, edit, store, and so on the parameters used for the signal processing, and other screens.

The detection I/F 15 is an interface to detect operations on the control 18 in accordance with the instructions from the CPU 11 by connecting the control 18 to the communication bus 25. The control 18 is made up of a key, a switch, a rotary encoder, and so on, and is a control to enable the user to directly operate the digital mixer 10 for editing the parameters, and so on.

The communication I/F 16 is an interface to control transmission and reception of data via the communication I/O 19 in accordance with the instructions from the CPU 11 by connecting the communication I/O 19 to the communication bus 25. The communication I/O 19 is capable of communicating with external equipment via a network or by a peer-to-peer communication.

The DSP 20 includes a signal processing circuit, and is a signal processor for performing signal processing on an input audio signal in accordance with values of signal processing parameters which are set to be reflected on the signal processing. The effector 21 has a function to add various effects such as reverb and chorus on the input audio signal and to output the resultant audio signal.

The AD converter 22 has a function to convert analog audio signals inputted from a plurality of input terminals into digital waveform data, and to supply the digital waveform data to the audio bus 26. The DA converter 23 has a function to convert digital waveform data of a plurality of channels obtained from the audio bus 26 into analog audio signals, and to output the analog audio signals from output terminals which are corresponded to the waveform data. The DD converter 24 has a function to perform a format conversion required to input or output the digital waveform data between the audio bus 26 and the terminals.

Besides, the audio bus 26 is capable of transmitting the digital waveform data in a plurality of channels by time-division manner, and each channel functions as a signal transmission path to transmit a signal from any output of processors (including the effector) or the converters connected to the audio bus 26 to any input of another processors or the converters connected to the audio bus 26.

Next, configurations of the signal processing function performed in the DSP 20 illustrated in FIG. 1 are illustrated in more detail from FIG. 2 to FIG. 5.

As illustrated in FIG. 2, the signal processing function in the DSP 20 includes an input patch 110, input channels 120, mixing buses 130, output channels 140, a cue bus 150, a cue (monitoring) output channel 160, and an output patch 170.

In the DSP 20, it is possible to patch (connect) any of input ports prepared so as to correspond to input terminals of the AD converter 22 or the DD converter 24 to each of the input channels 120 with N-pieces of channels from first (120-1) to N-th (120-N) by the input patch 110.

In each input channel 120, signal processing is performed on an audio signal inputted from the patched input port by each of signal processing parts of a head amplifier (HA) 121, a high pass filter (HPF) 122, an equalizer (EQ) 123, a dynamics 124, and a level adjustment part 125 as illustrated in FIG. 3. After that, the input channel 120 outputs the resultant audio signal to any number of arbitrary buses among the mixing buses 130 with M-pieces from first to M-th. Note that it is possible to individually set a level of output from each channel in the input channels 120 to each bus in the mixing buses 130 and turning on and off of the output.

Besides, the input channel 120 is capable of transmitting the audio signal which is taken out of any of takeout positions P1 to P3 provided at three positions as illustrated in FIG. 3 to the cue bus 150 as a cue signal for monitoring. A switch 126 performs switching of the takeout positions. Note that, to which contact point the switch 126 is connected, and thus at which position the cue signal is taken out, is controlled by the CPU 11 functioning as a first selector.

Besides, only the channel selected by the user as a monitoring object performs transmission of the cue signal to the cue bus 150. In the channel which is not selected, the switch 126 selects a contact point which is not connected to any of the takeout positions.

Besides, in respective lines of the mixing buses 130, the signal inputted from each input channel 120 is mixed, and the resultant signal is output to each of the output channels 140 which are M-pieces of channels from first (140-1) to M-th (140-M) to correspond to the respective lines of the mixing buses 130.

In each output channel 140, signal processing is performed on the audio signal inputted from the corresponding mixing bus by each of signal processing parts of an equalizer 143, a dynamics 144, and a level adjustment part 145 as illustrated in FIG. 4.

Besides, the output channel 140 is also capable of transmitting the audio signal taken out of any of takeout positions P4 to P6 provided at three positions as illustrated in FIG. 4 to the cue bus 150 as a cue signal. A switch 146 is a switch corresponding to the switch 126 performing switching of the takeout positions. Besides, only the channel selected by the user as the monitoring object performs transmission of the cue signal to the cue bus 150. At the channel which is not selected, the switch 146 selects a contact point which is not connected to any of the takeout positions.

Note that it is possible to simultaneously select the input channel 120 and the output channel 140 as the monitoring objects as a function of the digital mixer 10. However, it is assumed that only one of the input channel 120 or the output channel 140 is selected as the monitoring object.

The cue bus 150 performs mixing of the signal inputted from each input channel 120 and each output channel 140, and outputs the resultant signal to a cue output channel 160. The cue bus 150 functions as a signal supplier together with the cue switch 126 and the cue switch 146.

At the cue output channel 160, signal processing is performed for an audio signal inputted from the cue bus 150 by each of signal processing parts such as an attenuator 161, an equalizer 163, a dynamics 164, and a level adjustment part 165 as illustrated in FIG. 5.

Among them, the equalizer 163 performs the signal processing with the same algorithm as the equalizer 123 in the input channel 120 and the equalizer 143 in the output channel 140. Incidentally, parameters used for the signal processing are prepared as parameters of different items for each of the equalizer 123 and the equalizer 143, and they are independently editable.

The equalizer 123 and the equalizer 143 are a first signal processing part, and the equalizer 163 is a second signal processing part. Besides, the parameters used by the equalizer 123 and the equalizer 143 are first parameters, and the parameters used by the equalizer 163 are second parameters. As described later, the digital mixer 10 is capable of overwriting values of the second parameters by values of the first parameters, overwriting the values of the first parameters by the values of the second parameters, and combining the values of the first parameters with the values of the second parameters in accordance with operations by the user.

Relationships between the dynamics 164, the dynamics 124 in the input channel 120 and the dynamics 144 in the output channel 140 are the same as the above-described equalizers 123, 143, and 163.

Note that the attenuator 161 is a signal processing part which is not provided at the input channel 120 and the output channel 140 in the digital mixer 10. The level adjustment part 165 basically performs the signal processing with the same algorithm as the level adjustment part 125 in the input channel 120 and the level adjustment part 145 in the output channel 140, but they are not objects in which parameters are overwritten or combined with each other, different from the cases of the equalizers and the dynamics.

The output patch 170 patches each of the output channels 140 and the cue output channel 160 to output ports prepared to correspond to output terminals provided in the DA conversion part 23 or the DD conversion part 24, and supplies the resultant signal after being processed in each channel to the output port of a patch destination to be outputted. Note that the patch destination of the cue output channel 160 is a fixed output port for motoring output.

Note that the signal processing by each part provided in the DSP 20 can be controlled by setting predetermined parameter values stored in the memory including the above-described first parameters and second parameters. Besides, the function of each part may be realized by software or hardware.

Next, an example of a screen to edit the values of the parameters which are reflected on the signal processing is illustrated.

At first, an example of a screen to accept an edit operation of the parameters relating to the equalizer from the user is illustrated in FIG. 6. An EQ setting screen 300 is a screen which can be commonly used for any of the equalizer 123 provided in the input channel 120, the equalizer 143 provided in the output channel 140, and the equalizer 163 provided in the cue output channel 160. Each of these equalizers 123, 143, 163 performs signal processing with the same algorithm, and uses the same kind of parameters. Note that they are different signal processing parts, and therefore, it is possible to independently select any of the parameters as an edit object.

When accepting a specification of a channel and an instruction to edit the equalizer parameters from the user, the digital mixer 10 displays the EQ setting screen 300 illustrated in FIG. 6 on the display 17 as a screen to accept edit operation of the parameters relating to the equalizer of the specified channel.

This EQ setting screen 300 includes a band selection section 301, an on/off setting section 302, a Q value setting section 303, a center frequency setting section 304, a gain setting section 305, a frequency characteristic display section 306, and a level meter 307. The edit operation at each section is immediately reflected to the value of the parameters which is to be reflected on the signal processing (namely, the signal processing in process), and a display of the screen.

Among them, the band selection section 301 is a section in which buttons to select a band whose characteristics are to be edited by the Q value setting section 303, the center frequency setting section 304, and the gain setting section 305 are provided. In the example in FIG. 6, the equalizer has four bands, and four buttons are provided to correspond thereto.

The on/off setting section 302 is a button to switch on and off of a function of the equalizer. When the function of the equalizer is turned off, it can be regarded that a flat frequency characteristic is set for the equalizer.

The Q value setting section 303, the center frequency setting section 304, and the gain setting section 305 are controls to respectively set a Q value, a center frequency, and a gain value of the band selected as the edition object.

The frequency characteristic display section 306 is a section to display the frequency characteristics as a whole of the equalizer based on the Q value, the center frequency and the gain value set for each of four bands.

The level meter 307 is a section to display a level of an audio signal which is in process at a position of the equalizer of a channel which includes the editing object equalizer.

Operations for the above-described each s may be accepted as operations onto a position corresponding to a control on a touch panel, or may be accepted by physical controls by assigning the parameters to the physical controls such as a button and a knob out of the screen. Basically, each edit operation can be performed similarly no matter which channel the objective equalizer belongs to, among the input channel 120, the output channel 140, or the cue output channel 160.

Next, an example of a screen to accept an edit operation of parameters relating to the dynamics from the user is illustrated in FIG. 7. This screen is different from the EQ setting screen 300 in FIG. 6 only in items of the parameters whose settings are to be accepted, and the other basic functions are common to the EQ setting screen 300.

A dynamics setting screen 310 in FIG. 7 includes an on/off setting section 311, a threshold value setting section 312, a conversion ratio setting section 313, a gain setting section 314, a gain characteristic display section 315, and a level meter 316.

Among them, the on/off setting section 311 is a button to switch on and off of a function of the dynamics. When the function of the dynamics is turned off, it can be regarded that a characteristic not to adjust a level of an input signal but to output the input signal as it is set for the dynamics.

The threshold value setting section 312, the conversion ratio setting section 313, and the gain setting section 314 are controls to respectively set a threshold value, a conversion ratio, and a gain to define a relationship between a level of an input signal and a level of an output signal at the dynamics.

The gain characteristic display section 315 is a section to display the relationship between the level of the input signal and the level of the output signal defined based on the above parameters.

The level meter 316 is a section to display a level of an audio signal which is in process at a position of the dynamics of a channel which includes the editing object dynamics.

Next, an example of a screen to accept settings relating to monitoring from the user is illustrated in FIG. 8.

A cue setting screen 320 illustrated in FIG. 8 is a screen to accept settings relating to the monitoring using the cue bus 150 and the cue output channel 160 from the user. An input channel selection section 321, an output channel selection section 322, an apply button 323, and a close button 324 are included in the screen.

Among them, buttons corresponding to respective channels included in the input channels 120 and the output channels 140 are respectively provided in the input channel selection section 321 and the output channel selection section 322. By operating these buttons, the channel corresponding to the operated button can be selected as a monitoring object, and also selected as a reflection destination of parameters of the cue output channel 160.

In the example in FIG. 8, channels corresponding to buttons without hatching are selected as the monitoring objects, and channels corresponding to buttons with hatching are not selected as the monitoring objects. Besides, channels corresponding to buttons surrounded by dotted lines are selected to be the reflection destinations of the parameters of the cue output channel 160, and channels corresponding to buttons not surrounded by the dotted line are not selected to be the reflection destinations.

For example, by single-clicking each button, the user can switch by toggle whether or not the corresponding channel is selected to be the monitoring object. Besides, by double-clicking the button corresponding to the channel being selected to be the monitoring object (under the state without hatching), the user can switch by toggle whether or not the corresponding channel is set to be the reflection destination of the parameters. Note that when a certain channel is excluded from the monitoring object, the channel is automatically excluded from the reflection destination.

The selection and release of the monitoring object are immediately reflected on the signal processing in the digital mixer 10 and a display on the screen among the operations at the input channel selection part 321 and the output channel selection part 322. At the selection and release of the monitoring object, the CPU 11 functions as a second selector. Selection and release of the reflection destination are only reflected on the display when the operation is performed.

Note that the selection and release of the monitoring object can be performed by operating a cue switch provided in a channel strip on an operation panel of the digital mixer 10.

Next, the apply button 323 is a button to instruct to reflect the values of the parameters of the equalizer 163 and the dynamics 164 in the cue output channel 160 to the signal processing in the equalizer and the dynamics of the channel selected as the reflection destination. Concrete processing to perform the reflection is described later.

The close button 324 is a button to instruct to close the cue setting screen 320.

Note that a takeout position to take out the audio signal from the monitoring object channel can be uniformly set as for all channels at a screen different from the cue setting screen 320. Options thereof are prior to the equalizers 123, 143 (P1, P4), posterior to the dynamics 124, 144 (P2, P5), and posterior to the level adjustment parts 125, 145 (P3, P6). As for the takeout position, a common setting is applied for both the input channel 120 and the output channel 140.

Next, processing to reflect the operations in the cue setting screen 320 illustrated in FIG. 8 onto the operations of the digital mixer 10 are described.

At first, a flowchart of the processing executed by the CPU 11 of the digital mixer 10 when the monitoring object channel is newly selected is illustrated in FIG. 9.

When it is detected that the monitoring object channel is newly selected in the cue setting screen 320, the CPU 11 starts the processing illustrated in the flowchart in FIG. 9. At first, the CPU 11 judges whether or not there is a channel which has been already set to be the monitoring object (S11). When there is the monitoring object channel, the CPU 11 refers to a setting as for whether or not the current values of the parameters of the equalizer 163 and the dynamics 164 of the cue output channel 160 are used as they are without changing them in this case (S12). This setting is performed by the user as the setting relating to the whole of the digital mixer 10.

When it is set to use the current values as they are, the CPU 11 proceeds to step S17 while skipping steps S13 to S16. On the other hand, when it is set that the current values can be changed, the CPU 11 proceeds to step S13.

The CPU 11 also proceeds to step S13 when there is not the test-listening object channel at step S11.

At step S13, the CPU 11 determines the takeout position of the signal (S13). Note that this determination is performed to judge whether or not the parameters of the equalizer and the dynamics of the selected monitoring object channel are used for the signal processing in the cue output channel 160, and therefore, it is necessary to determine whether the takeout position is prior to or posterior to the equalizer and the dynamics. Here, when P1 or P4 is selected, the takeout position is determined as prior (Pre EQ/Dyna), and when a point other than P1 and P4 is selected, the takeout position is determined as posterior (Post EQ/Dyna).

When the takeout position is determined to be posterior in step S13, the CPU 11 resets the values of the parameters of the equalizer 163 and the dynamics 164 of the cue output channel 160 to default values (S14). It is thereby possible for the user to monitor the audio signal at the takeout position as it is other than performing the level adjustments at the attenuator 161 and the level adjustment part 165. Note that, in the digital mixer 10, the default values of the parameters of the equalizer 163 are values to make the frequency characteristics of the equalizer 163 flat, and the default values of the parameters of the dynamics 164 is values for not changing the level between the input and the output. Namely, the default values are values for not changing signal characteristics between the input and the output.

On the other hand, it is also possible to enable to monitor the audio signal at the takeout position as it is even when the takeout position is prior at step S13 by similarly resetting the values of the parameters of the cue output channel 160 to the default values.

However, in the digital mixer 10, it is enabled to perform the monitoring under a state suitable for adjustment of the values of the parameters of the monitoring object channel. This is enabled by overwriting the values of the parameters of the equalizer 163 and the dynamics 164 of the cue output channel 160 with the values of the parameters of the equalizer and the dynamics in the presently selected monitoring object channel.

As a result, the audio signal having almost the same characteristics as the audio signal outputted from the presently selected monitoring object channel is outputted from the cue output channel 160 though there may be a slight difference in the level adjustment degrees at the attenuator 161 and the level adjustment part 165 and a difference such that the outputted audio signal is mixed with another audio signal of another monitoring object channel if it exists. It is possible to edit the parameters of the equalizer 163 and the dynamics 164 from this state. Namely, it is possible to easily perform the edit operation to finely adjust the current setting of the monitoring object channel.

By overwriting the values of the parameters of the equalizer and the dynamics of the monitoring object channel with the edit result values of the cue output channel 160, the values of the parameters for obtaining the same characteristics as the monitored audio signal to the monitoring object channel.

Accordingly, when the takeout position is prior at step S13, the CPU 11 judges whether or not the setting to use the values of the parameters of the presently selected monitoring object channel has been made (S15), and when the setting has been made, the CPU 11 performs the overwriting of the values of the parameters as stated above (S16). When the setting has not been made, the CPU 11 resets the values of the parameters of the equalizer 163 and the dynamics 164 to the default values (S14). The setting which is referred to at step S15 is to be made by the user as the setting relating to the whole of the digital mixer 10 which is different from the setting referred to at step S12.

In any case, the CPU 11 finally controls the cue switch 126 or 146 of the monitoring object channel such that the audio signal of the selected monitoring object channel is outputted to the cue bus 150, and then ends the processing in FIG. 9. The audio signal of which takeout position is outputted to the cue bus 150 is subjected to the setting of the takeout position. After that, the CPU 11 functions as a signal supplier, and takes out the audio signal at the takeout position of the monitoring object channel as the cue signal for monitoring and supplies the cue signal to the cue bus 150.

Next, a flowchart of processing executed by the CPU 11 when the operation of the apply button 323 is detected is illustrated in FIG. 10.

In this case, the CPU 11 performs processes to reflect the values of the parameters of the equalizer 163 and the dynamics 164 of the cue output channel 160 onto the signal processing of the equalizer and the dynamics in the channel selected as the reflection destination (S22 to S24) in accordance with the takeout position of the cue signal (S21) as illustrated in FIG. 10. At step S21, the CPU 11 judges whether the takeout position is prior to or posterior to the equalizer and the dynamics similarly to the case of step S13 in FIG. 9.

Firstly, when the takeout position is prior at step S21, the CPU 11 overwrites the values of the parameters of the equalizer and the dynamics in the reflection destination channel with the values of the parameters of the equalizer 163 and the dynamics 164 of the cue output channel 160 (S22) as it is described using FIG. 9. The values of the parameters of the cue output channel 160 can be thereby reflected onto the signal processing in the reflection destination channel in a meaning that the audio signal having almost the same characteristics as the audio signal which is being monitored can be outputted from the reflection destination channel.

On the other hand, when the takeout position is posterior at step S21, the CPU 11 sets a combined values of the values of the parameters of the equalizer 163 of the cue output channel 160 and the values of the parameters of the equalizer in the reflection destination channel as values of the parameters of the equalizer in the reflection destination channel (S23). Besides, the CPU 11 a combined value of the values of the parameters of the dynamics 164 of the cue output channel 160 and the values of the parameters of the dynamics in the reflection destination channel as values of the parameters of the dynamics in the reflection destination channel (S24). Namely, the CPU 11 combines the values of the parameters of the reflection destination channel with the values of the parameters of the cue output channel 160.

Here, the "combined value" is a value of a parameter which realizes a relationship between the input and the output such that the output can be obtained as if the signal processing is sequentially performed on the input by the signal processing part of the reflection destination channel and the corresponding signal processing part of the cue output channel. In the case of the equalizer, the combined values are values of the parameters which realizes, by one equalizer, a total frequency characteristic obtained by multiplying (by adding in case of a decibel value) gain values at respective frequencies of two equalizers. In the case of the dynamics, the combined values are values of the parameters which realizes, by one dynamics, a relationship between a level of an input signal for a first dynamics and a level of an output signal of a second dynamics which is obtained by inputting an output signal of the first dynamics to the second dynamics.

The combined values as stated above can be obtained by a known arbitrary computation from the values of the parameters of the two equalizers or dynamics. It is accepted so long as the values of the parameters which realizes characteristics approximated to the desired one can be obtained, if it is not a complete combination.

In the above-stated processes in FIG. 10, the CPU 11 functions as a controller. Note that in the reflection of steps S22 to S24, it is recommended to gradually change the values of the parameters so as not to drastically change the characteristics of the signal in the monitoring object channel.

In the digital mixer 10 described hereinabove, there are provided, at the cue output channel 160, the equalizer 163 and the dynamics 164 which perform the signal processing common with the signal processing parts of the input channel 120 and the output channel 140 being the monitoring objects in accordance with the values of the parameters which are editable independent from the parameters used in the monitoring object channel. It is thereby possible to adjust the characteristics of the audio signal for monitoring without affecting on the audio signal for the performance or the like which is processed in the monitoring object channel.

Besides, it is possible to reflect the values of the parameters of the cue output channel 160 which are adjusted while monitoring the audio signal outputted from the cue output channel 160 onto the signal processing in a desired monitoring object channel. Accordingly, it is possible to change the characteristics of the audio signal for the performance or the like which is processed in the monitoring object channel to desired characteristics without letting the audiences in the hall or the like hear the adjustment process during the edit.

The description of the embodiment has been completed, but it goes without saying that the configuration of the apparatus, concrete configurations of the screens, concrete procedures of the processes, kinds of the signal processing parts provided in each channel, and so on are not limited to ones described in the above-stated embodiment.

For example, it is not essential that the signal processing parts commonly provided in the input channel 120, the output channel 140, and the cue output channel 160 are the equalizer and the dynamics. The signal processing part may be one of the above, or a signal processing part totally different from the above may be provided. Number of the signal processing part is also arbitrary.

Besides, when there is a signal processing channel other than the input channel 120 and the output channel 140 in the digital mixer 10, it goes without saying that the digital mixer 10 may be configured such that the signal processing channel can be selected as a monitoring object.

Besides, as for the "combination" at steps S23 and S24 in FIG. 10, it is also conceivable that a signal processing part for reflection is provided in advance in the input channel 120 and the output channel 140 which may be the reflection destination, and the reflection is performed by copying the parameters of the cue output channel 160 to the signal processing part for reflection.

A configuration example of an input channel when the above-described construction is applied is illustrated in FIG. 11. In FIG. 11, the same reference numerals and symbols are used for the configurations common to those in FIG. 3.

In an input channel 120' illustrated in FIG. 11, a second equalizer 127 is provided just subsequent to the equalizer 123, and a second dynamics 128 is provided just subsequent to the dynamics 124 in addition to the signal processing parts provided in the input channel 120 in FIG. 3. The second equalizer 127 and the second dynamics 128 respectively perform the signal processing with the same algorithms as those in the equalizer 123 and the dynamics 124. However, parameters used therein are those of different items. Besides, initial values of parameters used by the second equalizer 127 and the second dynamics 128 are ones to realize a signal processing not changing the characteristics of the input signal, and edit thereof by the user is not basically accepted.

When applying the construction, the CPU 11 copies the values of the parameters of the equalizer 163 and the dynamics 164 of the cue output channel 160 as the values of the parameters used by the second equalizer 127 and the second dynamics 128 at steps S23 and S24 in FIG. 10.

It is thereby possible to perform, as a whole of the input channel 120', the signal processing having the characteristics where the equalizer 123 and the equalizer 163 are combined by the equalizer 123 and the second equalizer 127. It is also the same as for the dynamics.

If there is a margin in the signal processing ability of the DSP 20, and it is enough if the parameters of the cue output channel 160 can be reflected on the reflection destination only once, it is possible to rapidly reflect the parameters by using the above-stated construction without performing a complicated calculation. It goes without saying that the similar construction is applicable for the output channel 140.

Note that as for the equalizer, for example, it is conceivable that the equalizer 123 is configured to be an eight-band equalizer, four bands among the eight bands are operated in accordance with the values of the parameters set by the user, and the remaining four bands are used as the above-described second equalizer 127.

Besides, at step S16 in FIG. 9, the channel to be a copy source of the values of the parameters of the equalizer 163 and the dynamics 164 of the cue output channel 160 may be arbitrary selected by the user from among the channels which are set to be the monitoring objects. When this selection is performed, the CPU 11 functions as a third selector. It is thereby possible for the user to more flexibly select and set the values of the parameters to be a reference of the edit.

Further, the functions of the digital mixer 10 described hereinabove are also enabled by a general computer executing required programs. In this case, an input and output device to input and output audio signals may be connected to the computer. Besides, the functions of the digital mixer 10 may be distributed to a plurality of devices. The plurality of devices may be operated to collaborate to function as a system including the equivalent functions as the digital mixer 10.

Besides, the above-stated programs may be stored in the ROM or the other nonvolatile storage medium (flash memory, EEPROM, and so on) and so on provided in the computer from the beginning. However, it is also possible to supply the programs by recording on an arbitrary nonvolatile recording medium such as a memory card, a CD, a DVD, a Blu-ray disc, and so on. The programs recorded on the recording media are installed on the computer to be executed, and thereby, the required processes are executed on the computer.

Further, it is also possible to download the programs from an external equipment including the recording medium storing the programs or an external equipment storing the programs on a storage device which are connected to network, and install the programs on the computer to be executed.

Besides, the invention is applicable for an arbitrary audio signal processing apparatus performing signal processing in a plurality of signal processing channels, other than the digital mixer. For example, it is conceivable to apply to an effector, a recorder, an amplifier, a synthesizer, and so on.

Besides, configurations and modification examples described hereinabove may be applied while combining one another within a consistent range.

INDUSTRIAL APPLICABILITY

As it is obvious from the above-stated description, according to the invention, it is possible to adjust the characteristics of the audio signal for monitoring without affecting on the audio signal for the performance.

Accordingly, it is possible to improve convenience of the monitoring function in the audio signal processing apparatus by applying the invention.

REFERENCE SIGNS LIST

10 . . . digital mixer, 11 . . . CPU, 12 . . . ROM, 13 . . . RAM, 14 . . . display I/F, 15 . . . detection I/F, 16 . . . communication I/F, 17 . . . display, 18 . . . control, 19 . . . communication I/O, 20 . . . DSP, 21 . . . effector, 22 . . . AD converter, 23 . . . DA converter, 24 . . . DD converter, 25 . . . communication bus, 26 . . . audio bus, 110 . . . input patch, 120 . . . input channel, 121 . . . head amplifier, 122 . . . high pass filter, 123, 143, 163 . . . equalizer, 124, 144, 164 . . . dynamics, 125, 145, 165 . . . level adjustment part, 126, 146 . . . cue switch, 130 . . . mixing bus, 140 . . . output channel, 150 . . . cue bus, 160 . . . cue output channel, 161 . . . attenuator, 170 . . . output patch, 300 . . . EQ setting screen, 310 . . . dynamics setting screen, 320 . . . cue setting screen

The invention claimed is:

1. An audio signal processing apparatus comprising:
a plurality of first signal processing channels each having a first signal modifier configured to modify an input audio signal in accordance with first parameters, wherein each of the first signal processing channels is one of an input or output channel;
a second signal processing channel different from the first signal processing channels and having a second signal modifier configured to modify the audio signal in accordance with second parameters that are editable independently of the first parameters, wherein the first and second modifiers use a common processing algorithm; and
a processor configured to implement instructions stored in a memory and execute:
a signal selecting task that selects one of the first signal processing channels as a monitoring object channel that provides a monitor signal and supplies the monitor signal to the second signal processing channel;
a parameter setting task that sets values of the second parameters for the second signal modifier, and sets to reflect, in accordance with an instruction from a user, the values of the second parameters into the first parameters for the first signal modifier; and
an output task that outputs, from the second signal processing channel, the monitor signal, which is modified by the second signal modifier, as an audio signal to be monitored.

2. The audio signal processing apparatus according to claim 1, wherein the signal selecting task selects the monitoring object channel also based on another instruction from the user.

3. The audio signal processing apparatus according to claim 1, wherein:
the signal selecting task:
further selects a position from among a plurality of specified positions, one of which is before the audio signal is modified by the first signal modifier and another of which is after the audio signal is modified by the first signal modifier; and
supplies the monitor signal from the selected position of the monitoring object channel to the second signal processing channel, and
the parameter setting task sets to reflect the values of the second parameters into the first parameters when the selected specified position is before the audio signal is modified by the first signal modifier.

4. The audio signal processing apparatus according to claim 1, wherein:
the signal selecting task:
further selects a position from among a plurality of specified positions, one of which is before the audio signal is modified by the first signal modifier and another of which is after the audio signal is modified by the first signal modifier; and
supplies the monitor signal from the selected position of the monitoring object channel to the second signal processing channel, and
the parameter setting task sets to reflect combined values of current values of the first parameters and the values of the second parameters into the first parameters when the selected specified position is after the audio signal is modified by the first signal modifier.

5. The audio signal processing apparatus according to claim 1, wherein the parameter setting task sets to reflect the values of the first parameters of a newly selected monitoring object channel, from among the first signal processing channels, into the second parameters when the signal selecting task selects the newly selected monitoring object channel.

6. The audio signal processing apparatus according to claim 5, wherein the parameter setting task sets to reflect the values of the second parameters into the first parameters of the monitoring object channel currently selected by the signal selecting task in accordance with the instruction from the user.

7. The audio signal processing apparatus according to claim 1, further comprising:
a mixer that mixes audio signals,
wherein the signal selecting task selects at least one of the first signal processing channels as at least one monitoring object channel,
wherein the mixer mixes audio signals respectively from the selected at least one first signal processing channel and supplies the resultant mixed audio signal to the second signal processing channel as the monitor signals, and
wherein the parameter setting task sets to reflect the values of the first parameters of one of the at least one monitoring object channel into the second parameters, the one of the at least one monitoring object channel being selected in accordance with another instruction from the user.

8. A non-transitory machine-readable storage medium storing program instructions executable by a processor of an audio signal processing apparatus, which comprises a plurality of first signal processing channels each having a first signal modifier configured to modify an input audio signal in accordance with first parameters, wherein each of the first signal processing channels is one of an input or output channel; and a second signal processing channel different from the first signal processing channels and having a second signal modifier configured to modify the audio signal in accordance with second parameters that are editable independently of the first parameters, wherein the first and second modifiers use a common processing algorithm, to execute a method comprising:
- a signal selecting step of selecting one of the first signal processing channels as a monitoring object channel that provides a monitor signal and supplying the monitor signal to the second signal processing channel;
- a parameter setting step of setting values of the second parameters for the second signal modifier and setting to reflect, in accordance with an instruction from a user, the values of the second parameters into the first parameters for the first signal modifier; and
- an outputting step of outputting, from the second signal processing channel, the monitor signal, which is modified by the second signal modifier, as an audio signal to be monitored.

9. A method of controlling an audio signal processing apparatus comprising:
- a plurality of first signal processing channels each having a first signal modifier configured to modify an input audio signal in accordance with first parameters, wherein each of the first signal processing channels is one of an input or output channel;
- a second signal processing channel different from the first signal processing channels and having a second signal modifier configured to modify the audio signal in accordance with second parameters that are editable independently of the first parameters, wherein the first and second modifiers use a common processing algorithm; and
- a processor configured to implement instructions stored in a memory,
- wherein the method is executable by the processor and comprises:
- a signal selecting step of selecting one of the first signal processing channels as a monitoring object channel that provides a monitor signal and supplying the monitor signal to the second signal processing channel;
- a parameter setting step of setting values of the second parameters for the second signal modifier and setting to reflect, in accordance with an instruction from a user, the values of the second parameters into the first parameters for the first signal modifier; and
- an outputting step of outputting, from the second signal processing channel, the monitor signal, which is modified by the second signal modifier, as an audio signal to be monitored.

* * * * *